United States Patent [19]

Inada et al.

[11] Patent Number: 4,823,336

[45] Date of Patent: Apr. 18, 1989

[54] OPTICAL DISK DRIVE

[75] Inventors: Hitoshi Inada, Atsugi; Tetsuo Kanno, Ebina, both of Japan

[73] Assignee: Ricoh Company, Limited, Tokyo, Japan

[21] Appl. No.: 14,288

[22] Filed: Feb. 13, 1987

[30] Foreign Application Priority Data

Feb. 14, 1986 [JP] Japan .............................. 61-18833[U]
Feb. 14, 1986 [JP] Japan .............................. 61-18834[U]

[51] Int. Cl.$^4$ ......................... G11B 3/38; G11B 21/10
[52] U.S. Cl. ................................. 369/215; 360/106; 369/219; 369/221; 369/224; 369/249
[58] Field of Search .............. 369/219, 220, 215, 249, 369/221, 222, 223, 224, 225, 226; 360/106

[56] References Cited

U.S. PATENT DOCUMENTS

| | | | |
|---|---|---|---|
| 3,993,316 | 11/1976 | Fairbanks | 369/220 |
| 4,150,833 | 4/1979 | Yamamura | 369/225 |
| 4,322,840 | 3/1982 | Kusaka | 369/220 |
| 4,613,962 | 9/1986 | Inoue et al. | 369/219 |
| 4,698,798 | 1/1987 | Faber et al. | 369/219 |

*Primary Examiner*—Steven L. Stephan
*Attorney, Agent, or Firm*—Cooper & Dunham

[57] ABSTRACT

An optical disk drive includes an optical disk, a pair of guide shafts, a carriage having an optical pick-up movable in the radial direction of the disk as guided by the guide shafts. A plurality of rollers are rotatably mounted on the carriage so that a rolling contact is provided between the guide shafts and the carriage. Preferably, one of the rollers is pressed against the associated guide shaft so as to absorb any play which may exist in the rollers. Each of the guide shafts is so structured to define a part of a closed magnetic flux circuit, and each of a pair of coils fixedly mounted on the carriage is loosely fitted on this part of the associated guide shaft. As a result, a pair of linear motors is defined on both sides of the carriage using the pair of guide shafts to define a pair of closed magnetic flux circuits partly.

11 Claims, 4 Drawing Sheets

OPTICAL DISK DRIVE

BACKGROUND OF THE INVENTION

1. Field of the Invention

This invention generally relates to an information storage apparatus, and, in particular, to an optical disk drive including an optical disk for storing information thereon.

2. Description of the Prior Art

Recently, there has been proposed various high density memory storage apparatus employing an optical recording medium on which information is stored with the use of a light beam, such as a laser beam. One typical example is an optical disk drive using an optical disk as a recording medium. Generally speaking, an optical disk drive includes an optical disk as a means for storing information thereon, driving means for driving to rotate the optical disk in a predetermined direction, an optical pick-up provided with a light source and an optical system for directing a light beam to the surface of the optical disk and positioning means for positioning the optical pick-up relative to the optical disk in the radial direction thereof.

In the case of an optical disk drive, an optical disk provided with either a single spiral recording track or a plurality of concentric recording tracks is driven to rotate in a predetermined direction and a laser beam modulated with information to be recorded is directed to the surface of the optical disk, whereby a series of pits is formed on the optical disk along the recording track in accordance with the information to be recorded. The track of the optical disk typically has the width of approximately 1 micron and also the track pitch of approximately 2 microns, and the size of the beam spot formed on the optical disk is also in the order of 1 micron. On the other hand, in the read out mode, a laser beam of predetermined intensity is directed to a desired track of the optical disk in rotation, whereby the reflecting light from the optical disk is detected to retrieve the information recorded on the optical disk. In the case where pits are formed as described above, the optical disk may be written only once. However, if use is made of other means, such as local inversion of the direction of magnetization, for storing information, the information written on the optical disk may be erased and the optical disk may be used for writing in of another information, in which case the optical disk is erasable.

The optical pick-up typically includes a semiconductor laser for emitting a laser beam, a collimator lens for receiving the laser beam from the laser and having it collimated as it passes therethrough, an objective lens for receiving the collimated laser beam after passing through a beam splitter and causing it to be focused on a recording track defined on the recording surface of the optical disk. Typically, a quarter wavelength plate is also provided between the objective lens and the beam splitter. Then the reflecting laser beam from the optical disk again passes through the objective lens this time in the opposite direction and then the quarter wavelength plate and then it is deflected by the beam splitter into a detecting optical system which typically includes a tracking error detector and a focusing error detector. Thus, the deflected laser beam is received not only by the tracking error detector but also by the focusing error detector so that there are obtained a tracking error signal and a focusing error signal, which are supplied to a tracking servo controller and to a focusing servo controller, respectively, which, in turn, define part of the relative positioning means between the optical disk and the optical pick-up.

The optical pick-up is typically provided with a tracking actuator for moving the objective lens in the widthwise direction of the track and with a focusing actuator for moving the objective lens closer to or separated away from the optical disk. These tracking and focusing actuators are activated under the control of the respective tracking and focusing servo controllers so that the objective lens is moved so as to bring the tracking and focusing errors to zero, whereby the relative positioning between the objective lens and a particular recording track of the optical disk is established and a beam spot of predetermined size is formed on a particular recording track of the optical disk. In this case, if the objective lens is moved over a relatively large distance in the tracking direction, i.e., widthwise direction of the recording track, in accordance with a signal from the tracking servo controller, the optical axis of the laser beam deviates significantly from a predetermined position. For this reason, there is a case in which the position of receiving the laser beam at the detector is shifted too far, thereby preventing to obtain read-out and error signals properly. Thus, in order to prevent from this happening, it is typically so structured that the optical pick-up itself moves in association with the movement of the objective lens so as to prevent the receiving position of the laser beam at the detector from shifting too far.

In moving the optical pick-up in this manner, the response speed of the system when a drive signal corresponding to the amount of movement in association with the timing of movement of the objective lens is supplied must be high. For this purpose, as a driving source for driving to move the optical pick-up in the tracking direction, use is typically made of a linear motor which directly generates linear motion and which is high in responsiveness. Thus, in a compact optical disk drive, use is typically made of a linear motor having a structure in which a moving coil is provided on a carriage on which the optical pick-up is mounted and a magnetic circuit member, such as a permanent magnet, is provided on a chassis. In such a typical linear motor or actuator, a pair of guide shafts is provided in parallel with the tracking direction and each of the guide shafts is sandwiched by a plurality of rollers rotatably mounted on both sides of the carriage, thereby providing a smooth guide to the carriage in the tracking direction.

In such a typical prior art structure in which the linear motor is mounted at the bottom surface of the carriage, the linear motor is necessarily disposed in the rear of the optical pick-up which extends through the carriage. For this reason, the thrust center, i.e., the center position where the thrust of the linear motor is produced, is located far apart from the center of gravity of the carriage, which is located in the interior of the optical pick-up having the largest mass among the components of the linear motor. In this manner, with the thrust center being separated far away from the center of gravity, a moment is generated when the carriage is moved so that there appears a pitching motion in the carriage. Besides, as described above, since the linear motor is operated finely in synchronism with the movement of the objective lens in the tracking direction, such a pitching motion has a relatively high frequency component.

In addition, as described above, the carriage is supported on the guide shafts via a plurality of rollers, so that when the front portion of the carriage moves downward for some reason at the location where the front rollers are provided by the amount of play, the rear portion of the carriage moves upward at the location where the rear rollers are provided by the similar amount of play. In other words, the carriage could move up and down by the amount of play of the rollers. The resonant condition of such an up and down vibration of the carriage has a relatively large frequency, and, thus, when the carriage is set in a resonant condition with the frequency component of the before-mentioned pitching motion, the amplitude of the up and down motion is significantly amplified, whereby the tracking servo and focusing servo controls are adversely affected. Besides, since the optical pick-up and the linear motor are mounted on the top and bottom surfaces of the carriage, respectively, the optical disk drive tends to have a large thickness, thereby hindering to make the overall structure compact in size.

SUMMARY OF THE INVENTION

In accordance with the present invention, there is provided an optical disk drive including a carriage for carrying thereon an optical pick-up and at least one linear motor for driving to move the carriage along a predetermined path, whereby the linear motor is disposed at a side of the carriage. With this structure, the overall size of the optical disk drive is made smaller in size, in particular its thickness, so that the optical disk drive can be made compact in size. In accordance with an additional feature of the present invention, it is so structured that the center of gravity of the carriage and the thrust center of the linear motor are located closer together as much as possible, thereby allowing to minimize the pitching motion of the carriage.

It is therefore a primary object of the present invention to obviate the disadvantages of the prior art as described above and to provide an improved optical disk drive.

Another object of the present invention is to provide an improved optical disk drive small in size and sturdy in structure.

A further object of the present invention is to provide an improved optical disk derive free of unnecessary attendant motion and thus stable and excellent in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
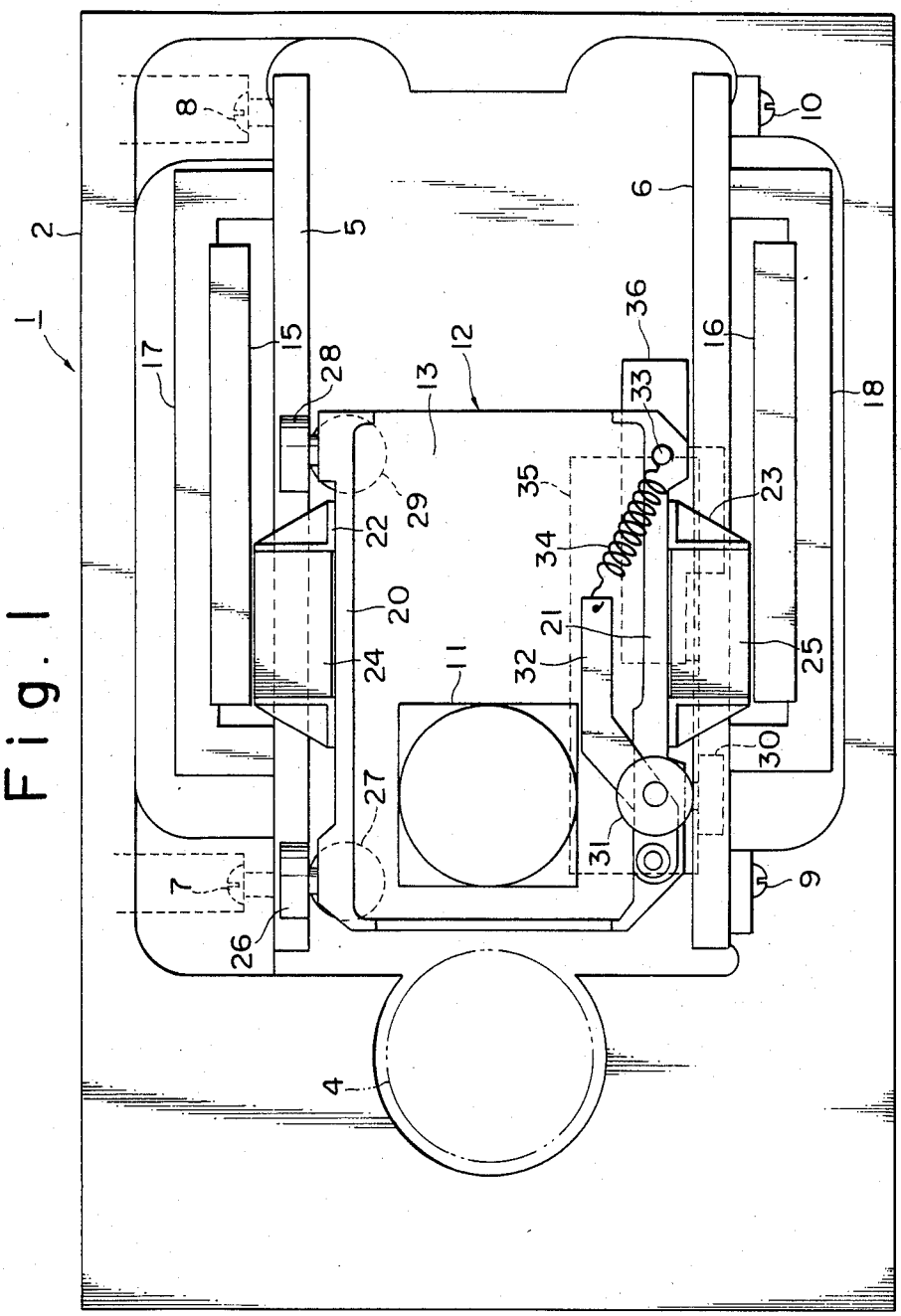
FIG. 1 is a plan view showing an optical disk drive constructed in accordance with one embodiment of the present invention.
Figure 2:
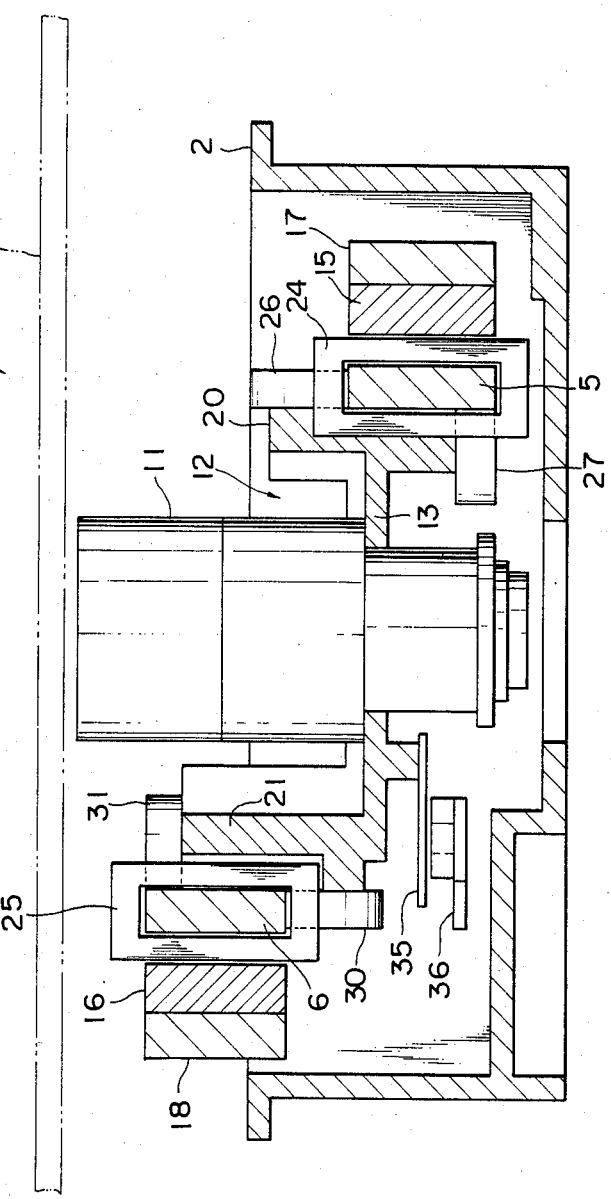
FIG. 2 is a transverse, partially cross sectional view of the optical disk drive shown in FIG. 1.
Figure 3:
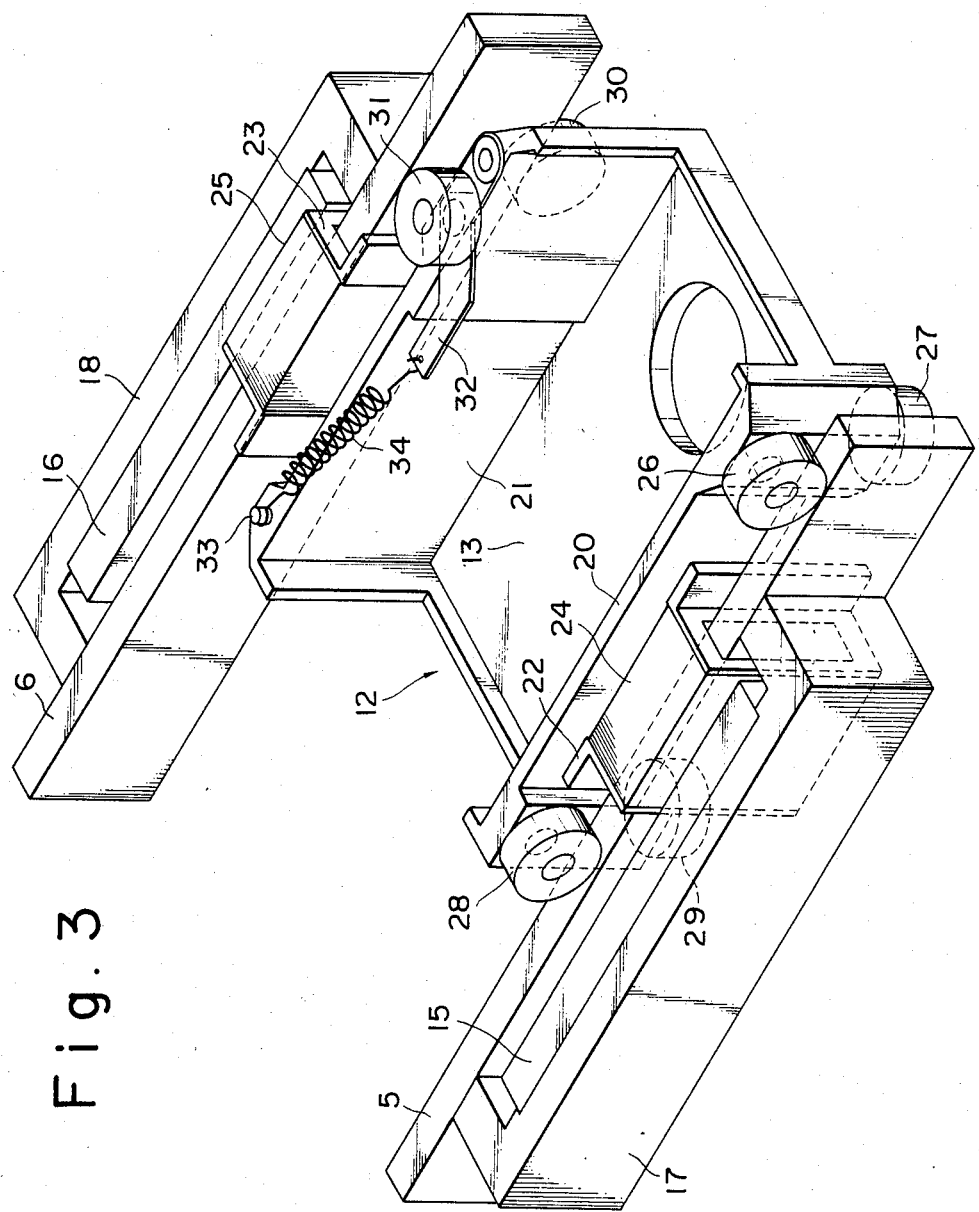
FIG. 3 is a perspective view showing how the linear motor is mounted on the carriage in the optical disk drive shown in FIGS. 1 and 2.

Referring now to FIGS. 1 and 2, there is shown an optical disk drive 1 constructed in accordance with one embodiment of the present invention. As shown, the optical disk drive 1 includes a chassis 2 on which a spindle motor 4 is fixedly mounted. An optical disk 3 is fixedly mounted at the top end of and driven to rotate in a predetermined direction by the spindle motor 4. A pair of guide shafts 5 and 6, elongated straight and rectangular in cross sectional shape, is fixedly attached to the chassis 2 at different elevation by means of screws 7–10. These guide shafts 5 and 6 are located on both sides of the spindle motor 4 and extend in parallel and generally in the radial direction of the optical disk 3. Also provided is a carriage 12 which is supported to be movable along the guide shafts 5 and 6, as will become clear later, and, thus, the carriage 12 moves relative to the stationary chassis 2. The carriage 12 has a flat bottom plate 13 which generally extends between the two guide shafts 5 and 6, and, as best shown in FIG. 2, the guide shaft 5 is disposed at one side of the carriage with its center located below the bottom plate 13 of the carriage 12. On the other hand, the other guide shaft 6 is disposed at the other side of the carriage 12 with its center located higher in level than the bottom plate 13 of the carriage 12. Also provided is a pair of yokes 17 and 18, which are generally C-shaped and fixedly attached to the guide shafts 5 and 6, respectively, with their ends abutting against one surface of corresponding guide shaft 5 or 6. Thus, a closed circuit is defined by each combination of guide shaft and yoke, i.e., 5 and 17 or 6 and 18. In addition, a permanent magnet 15 or 16 is fixedly attached to the side surface of the yoke 17 or 18 facing the corresponding guide shaft 5 or 6.

A pair of bobbins 22 and 23 is fixedly mounted on the carriage 12 on both side plates 20 and 21 thereof for supporting coils 24 and 25, respectively. Each of the coils 24 and 25 is so supported that it is loosely fitted onto the corresponding one of the guide shafts 5 and 6 with a predetermined gap therebetween. Thus, each of the coils 24 and 25 move along the corresponding one of the straight guide shafts 5 and 6 which define a predetermined travelling path for the carriage 12 over a distance defined by the longitudinal length of the permanent magnet 15 or 16 or yoke 17 or 18. In other words, a closed magnetic flux circuit is defined by a combination of the paired guide shaft 5 or 6 and yoke 17 or 18, and the coil 24 or 25 receives an external force from this associated closed magnetic circuit when current is passed.

The side plate 20 of the carriage 12 rotatably supports a pair of rollers 26 and 28 which ride on the top surface of the guide shaft 5 and also another pair of rollers 27 and 29 which are in rolling contact with the inner side surface of the guide shaft 5. Here, the inner side surface of each of the guide shafts 5 and 6 indicate a side surface of each of the guide shafts 5 and 6 which face opposite to each other. Accordingly, the rollers 26 through 29 are so provided that the axis of rotation of each of the rollers 26 and 28 is normal to the axis of rotation in each of the rollers 27 and 29. In the illustrated embodiment, the rollers 26 and 27 are located at the front end of the carriage 12 and the rollers 28 and 29 are located at the rear end of the carriage 12. Thus, the bobbin 22 and the coil 24 supported by the bobbin 22 are located in between the rollers 26 and 27 and the rollers 28 and 29. On the other hand, the other side plate 21 of the carriage 12 is rotatably provided with a roller 30 which rides on or in rolling contact with the bottom surface of the guide shaft 6 and also with another roller 31 via a pivotted bracket 32. That is, the bracket 32 has its base end pivotted to the top surface of the side plate 21 at its front end and its free end connected to one end of a coil spring 34 whose other end is connected to a pin 33 planted in the side plate 20 at the rear end thereof. The horizontal roller 31 is rotatably mounted on the bracket 32 at a position closer to its base end, so that the roller 31 is brought into rolling contact with the inner side surface of the guide shaft 6 under the force of the spring 34. With this structure, any play of the rollers, in particular horizontal rollers, rotatably mounted on the carriage 12 is absorbed.

At the bottom surface of the carriage 12 is fixedly mounted a linear encoder plate 35 for detecting the linear motion of the carriage 12, and a sensor 36 associated with the encoder plate 35 is fixedly mounted on the chassis 2.

As described above, there is defined a pair of linear motors which includes a pair of closed magnetic circuit structures, defined by the guide shafts 5, 6, permanent magnets 15, 16 and yokes 17 and 18, and a pair of coils 24 and 25 loosely fitted onto the guide shafts 5 and 6, respectively. That is, each of the linear motors is defined at each side of the carriage 12 and it includes a closed magnetic circuit defined by a combination of guide shaft 5, permanent magnet 15 and yoke 17 or of guide shaft 6, permanent magnet 16 and yoke 18 and an associated coil 24 or 25. Since the guide shafts 5 and 6 are fixedly mounted on the stationary chassis 2 and the coils 24 and 25 are fixedly mounted on the carriage 12, the carriage 12 may be moved in a reciprocating manner along the pair of guide shafts 5 and 6 back and forth. This linear motion of the carriage 12 results in the motion of the optical pick-up 11 relative to the optical disk 3 in the radial direction thereof. Thus, these linear motors serve to locate the optical pick-up 11 to a desired track of the optical disk 3 and also to carry out tracking error correction.

In the present embodiment described above, the vertical position of the side plate 20 of the carriage 12 is determined by the rollers 26 and 28 in rolling contact with the top surface of the guide shaft 5 and the horizontal position of the side plate 20 is determined by the rollers 27 and 29 in rolling contact with the inner side surface of the guide shaft 5. In addition, the vertical position of the other side plate 21 of the carriage 12 is determined by the roller 30 in rolling contact with the bottom surface of the guide shaft 6 and the horizontal position of the side plate 21 is determined by the roller 31 in rolling contact with the inner side surface of the guide shaft 6. As described before, the roller 31 is pressed against the guide shaft 6 under the force of the coil spring 34 so that any play of the associated rollers, in particular those of the horizontal rollers is absorbed and the carriage 12 can maintain a constant orientation with respect to its travelling path or the guide shafts 5 and 6. This insures a stable running operation of the carriage 12 along the guide shafts 5 and 6, whereby the pitching motion incurred to the carriage during its linear motion is minimized.

As described above, since the horizontal roller 31 is pressed against the guide shaft 6, there is no play between the roller 31 and the guide shaft 6 and also between the rollers 27 and 29 and the guide shaft 5. The vertical rollers 26 and 28 ride on the top surface of the guide shaft 5 by the weight of the carriage assembly, so that there is also no play between the rollers 26 and 28 and the guide shaft 5. In addition, since the horizontal roller 31 is pressed against the guide shaft 6 by means of the coil spring 34, the vertical roller 30 is pressed against the bottom surface of the guide shaft 6 because the horizontal roller 31 is located above the vertical roller 30, so that there is also no play between the roller 30 and the guide shaft 6. Of course, there is no play between the roller 31 and the guide shaft 6 because it is pressed against the guide shaft 6. As a result, there is no play in any of the rollers and this indicates that the carriage 12 has a least possibility of being subjected to undesired motions, such as pitching and rolling, other than desired linear motion.

Figure 4:
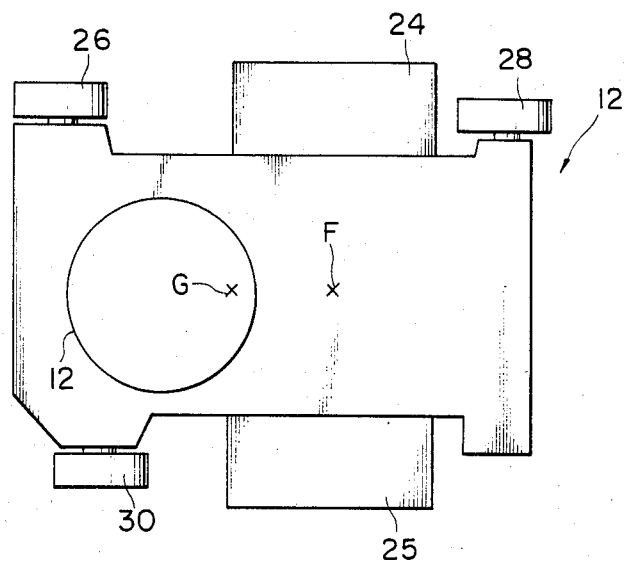
FIG. 4 is a schematic illustration showing the positional relation between the center of gravity and the thrust center in the optical disk drive shown in FIGS. 1 through 3.
Figure 5:
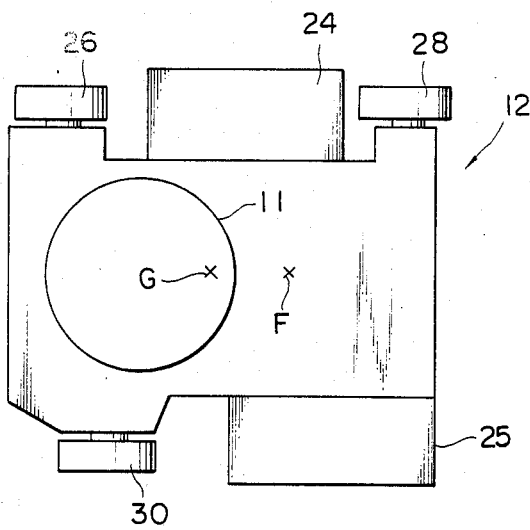
FIG. 5 is a schematic illustration showing another embodiment in which the center of gravity and the thrust center are located closer together as compared with the case shown in FIG. 4.

In addition, in the above-described structure, the guide shafts 5 and 6 not only serve to guide the linear movement of the carriage 12, but also to define part of a closed magnetic circuit of a linear motor as a driving source of the carriage 12. As a result, the overall structure of the optical disk drive can be made smaller. Incidentally, the guide shafts 5 and 6 are preferably made of a material, such as soft iron, with its surface plated with chromium at least partly for providing a strong surface having an increased hardness. It should also be noted that the arrangement of the linear motors on both sides of the carriage allow to make the entire structure flatter. In addition, the present invention allows to locate the linear motor closer to the optical pick-up 11 as much as possible, so that the distance between the center of gravity of the carriage 12 and the thrust center of the linear motors can be made shorter, which thus allows to minimize the pitching motion which might be caused in the movement of the carriage 12. Described more in detail in this respect, the positional relation between the center of gravity and the thrust center in the optical disk drive described above is schematically shown in FIG. 4. In this case, the center of gravity G is located inside of and somewhat toward the rear of the optical pick-up 11 and the thrust center F is located between the coils 24 and 25. FIG. 5 schematically shows the positional relation between the center of gravity F and the thrust center F of another embodiment, in which case the distance between the center of gravity G and the thrust center F is made shorter by shortening the overall longitudinal size of the carriage 12 and bringing the coil 25 as close to the roller 30 as practically possible. With such a shortened distance between the center of gravity G and the thrust center F, the possibility of occurrence of pitching motion is further reduced.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims. For example, although the present invention has been described with respect to the case when applied to an optical disk drive, the principle of the present invention may also be applied to any other devices and apparatuses, such as an ordinary disk drive including a magnetic head. Besides, in the above-described embodiment, the guide shafts 5 and 6 are provided at different levels; however, as an alternative structure, the guide shafts may be provided at the same level with attending modifications to the carriage 12 and the position of the rollers, if desired.

What is claimed is:

1. A disk drive comprising:
   a pair of guide shafts spaced apart over a predetermined distance, each extending straight and parallel to each other and each of said pair of guide shafts having a pair of top and bottom surfaces and a pair of inner and outer side surfaces;
   a carriage for mounting thereon a read/write means for reading and writing information to and from a recording medium; and
   a plurality of rollers rotatably mounted on said carriage, said plurality of rollers including a first plurality of rollers in rolling contact with one of said pair of guide shafts and a second plurality of rollers in rolling contact with the other of said pair of guide shafts, thereby allowing said carriage to move along said pair of guide shafts linearly, said first plurality of rollers including two pairs of rollers which are rotably mounted on said carriage, each pair of which includes a vertical roller in rolling contact with the top surface of a corresponding one of said pair of guide shafts and a horizontal roller in rolling contact with the inner side surface of the corresponding one of said pair of guide shafts, and said second plurality of rollers including a pair of a horizontal roller in rolling contact with the inner side surface of the other of said pair of guide shafts and a vertical roller in rolling contact with the bottom surface of the other of said pair of guide shafts.

2. The disk drive of claim 1 wherein said pair of guide shafts are substantially identical in shape and located horizontally at different vertical levels.

3. The disk drive of claim 1 wherein each of said pair of guide shafts is rectangular in cross sectional shape and said disk drive further comprises:
   means for producing a magnetic flux in each of said pair of guide shafts over a predetermined distance thereof; and
   a pair of coils fixedly mounted on said carriage, each of said coils being loosely fitted onto a corresponding one of said pair of guide shafts in the predetermined distance thereof.

4. The disk drive of claim 3 wherein said carriage has a pair of first and second sides, each of which is fixedly provided with a corresponding one of said pair of coils.

5. The disk drive of claim 4 wherein said two pairs of rollers of said first plurality of rollers are rotatably mounted at said first side of said carriage one at a front end thereof and the other at a rear thereof.

6. The disk drive of claim 1 further comprising biasing means for biasing at least one of said rollers against an associated one of said pair of guide shafts.

7. The disk drive of claim 6 wherein said biasing means includes a pivotal lever pivoted to said carriage and carrying at least one of said rollers rotatably and applying means for applying a biasing force to said lever in a predetermined direction, said at least one roller carried by said lever being pressed against associated guide shaft.

8. The disk drive of claim 8 wherein said at least one roller carried by said lever includes said horizontal roller of said second plurality and said applying means includes a coil spring.

9. The disk drive of claim 3 wherein said means for producing includes a pair of yokes each of which has a pair of ends fixedly attached to a corresponding one of said pair of guide shafts at ends of said predetermined distance and a pair of permanent magnets each of which is fixedly attached to a corresponding one of said yokes.

10. The disk drive of claim 1 wherein said recording medium is a memory disk provided with at least one recording track, which is supported to be driven to rotate, and said carriage is supported by said pair of guide shafts so as to be movable in a radial direction of said disk.

11. The disk drive of claim 10 wherein said memory disk is an optical disk and said read/write means includes an optical pick-up.

* * * * *